US008202415B2

(12) United States Patent
Larson

(10) Patent No.: US 8,202,415 B2
(45) Date of Patent: Jun. 19, 2012

(54) HYDROCYCLONES FOR TREATING DRILLING FLUID

(75) Inventor: Thomas Robert Larson, Montgomery, TX (US)

(73) Assignee: National Oilwell Varco, L.P., Houston, TX (US)

( * ) Notice: Subject to any disclaimer, the term of this patent is extended or adjusted under 35 U.S.C. 154(b) by 476 days.

(21) Appl. No.: 12/423,127

(22) Filed: Apr. 14, 2009

(65) Prior Publication Data

US 2010/0258512 A1 Oct. 14, 2010

(51) Int. Cl.
*B01D 21/26* (2006.01)

(52) U.S. Cl. ..................... 210/103; 210/788; 210/512.1; 209/726; 209/727; 209/734; 175/66; 166/265

(58) Field of Classification Search .................. 210/788, 210/103, 512.1; 209/727, 734, 726; 175/66; 166/265
See application file for complete search history.

(56) References Cited

U.S. PATENT DOCUMENTS

| | | | | |
|---|---|---|---|---|
| 1,832,256 | A | 11/1931 | Stebbins | |
| 2,954,871 | A | 10/1960 | Lummus et al. | |
| 3,016,962 | A | 1/1962 | Lummus et al. | |
| 3,025,965 | A | 3/1962 | Bergman et al. | |
| 3,057,476 | A | 10/1962 | Gilbert | |
| 3,353,673 | A | 11/1967 | Visman | |
| 3,358,833 | A | 12/1967 | Cantrell | |
| 3,385,437 | A | 5/1968 | Woodruff | |
| 3,399,770 | A | 9/1968 | Salomon | |
| 3,887,456 | A | 6/1975 | Loughner | 209/211 |
| 3,893,914 | A | 7/1975 | Bobo | 209/144 |
| 3,964,557 | A | 6/1976 | Juvkam-Wold | 175/66 |
| 4,067,814 | A | 1/1978 | Surakka et al. | 210/512 R |
| 4,090,523 | A | 5/1978 | Kelly, Jr. et al. | 134/18 |
| 4,134,828 | A | 1/1979 | Trawinski | 209/211 |
| 4,175,036 | A | 11/1979 | Frykhult | 209/211 |
| 4,226,708 | A | 10/1980 | McCartney | 209/211 |
| 4,278,534 | A | 7/1981 | Jakobson | 209/211 |
| 4,793,925 | A | 12/1988 | Duvall et al. | 210/512.1 |
| 4,983,283 | A | 1/1991 | Grey | 210/104 |
| 5,108,608 | A | 4/1992 | Carroll | 210/512.1 |
| 5,225,082 | A | 7/1993 | Young et al. | 210/512.1 |
| 5,240,115 | A | 8/1993 | Crossley et al. | 209/211 |
| 5,560,818 | A | 10/1996 | Sharrow | 209/170 |

(Continued)

FOREIGN PATENT DOCUMENTS

FR 2 511 268 7/1983

OTHER PUBLICATIONS

GB 1005110.0 Search Report (May 13, 2010).

(Continued)

*Primary Examiner* — David A Reifsnyder
(74) *Attorney, Agent, or Firm* — Williams, Morgan & Amerson, P.C.

(57) ABSTRACT

Methods and systems are disclosed for treating a drilling fluid mixture including feeding the drilling fluid mixture to a hydrocyclone (or hydrocyclones) with a flow-volume-adjustable inlet for controlling flow of the drilling fluid mixture into the hydrocyclone(s). This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

17 Claims, 11 Drawing Sheets

U.S. PATENT DOCUMENTS

| | | | | |
|---|---|---|---|---|
| 5,651,466 | A * | 7/1997 | Satomi | 210/512.1 |
| 5,858,237 | A | 1/1999 | Hashmi et al. | 210/512.1 |
| 6,129,217 | A | 10/2000 | Trickey et al. | 209/727 |
| 6,596,169 | B1 | 7/2003 | Rong et al. | 210/512.1 |
| 6,743,359 | B1 | 6/2004 | Smyth et al. | 210/512.1 |
| 7,036,529 | B2 | 5/2006 | Berggren et al. | 137/892 |
| 7,135,107 | B2 | 11/2006 | Palmer | 210/104 |
| 7,160,474 | B2 | 1/2007 | Harding | 210/801 |
| 7,293,657 | B1 | 11/2007 | Kelton et al. | 209/715 |
| 7,543,600 | B2 | 6/2009 | Berggren et al. | 137/219 |
| 2001/0002009 | A1 | 5/2001 | Gil et al. | 210/512.1 |
| 2004/0069536 | A1 | 4/2004 | Cowan | |
| 2005/0021246 | A1 | 1/2005 | Olson | 702/34 |
| 2006/0186038 | A1 | 8/2006 | Nassif | 210/512.1 |
| 2008/0135300 | A1 | 6/2008 | James | 175/66 |
| 2009/0084714 | A1 | 4/2009 | Schook | 209/639 |
| 2009/0120850 | A1 | 5/2009 | Kruyer | 209/725 |
| 2010/0059453 | A1 | 3/2010 | Reardon et al. | |

OTHER PUBLICATIONS

Flowline to Disposal Solutions—Solids Control, Brandt-National Oilwell Varco, p. 18 (2006).

Hydrocyclones, Engineering Specialties, Inc., one page (1998).

Brandt Hydrocyclones; affordable solids control, superior wear characteristics, Brandt A Varco Company, two pages (2003).

Desand • Degrit • Dewater, Flo Trend Systems, Inc., two pages (1989).

Solids Control Handbook, SWECO, Inc., cover page, pp. 21-24, 37-41, 53-57, 67-69 (1988).

* cited by examiner

Fig. 3C
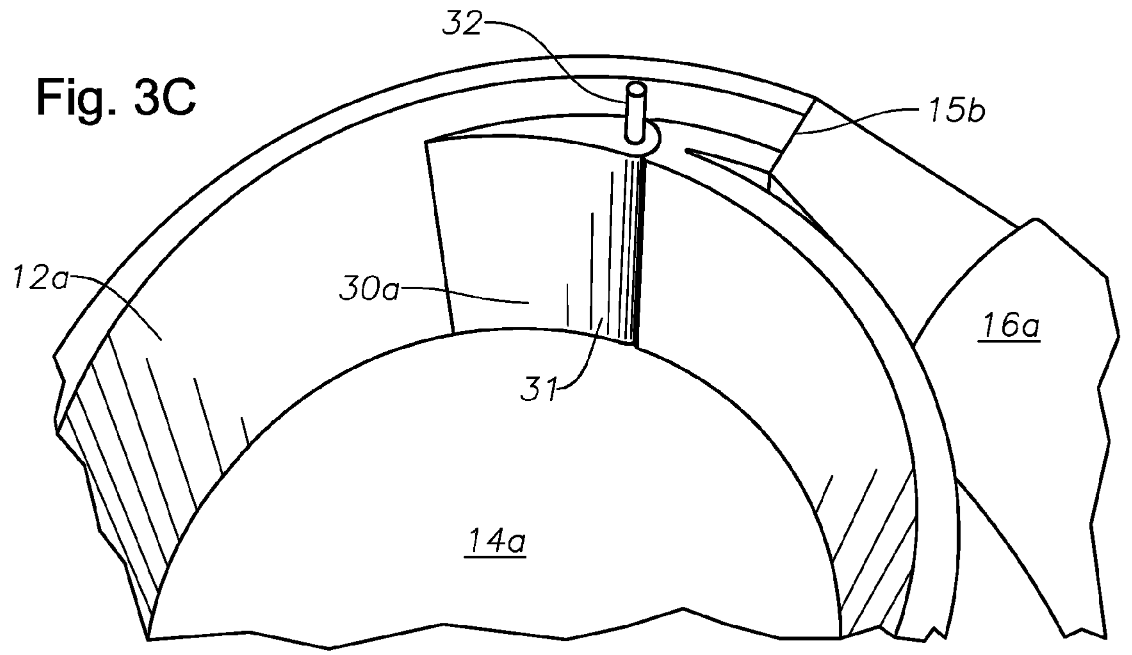
Fig. 3D
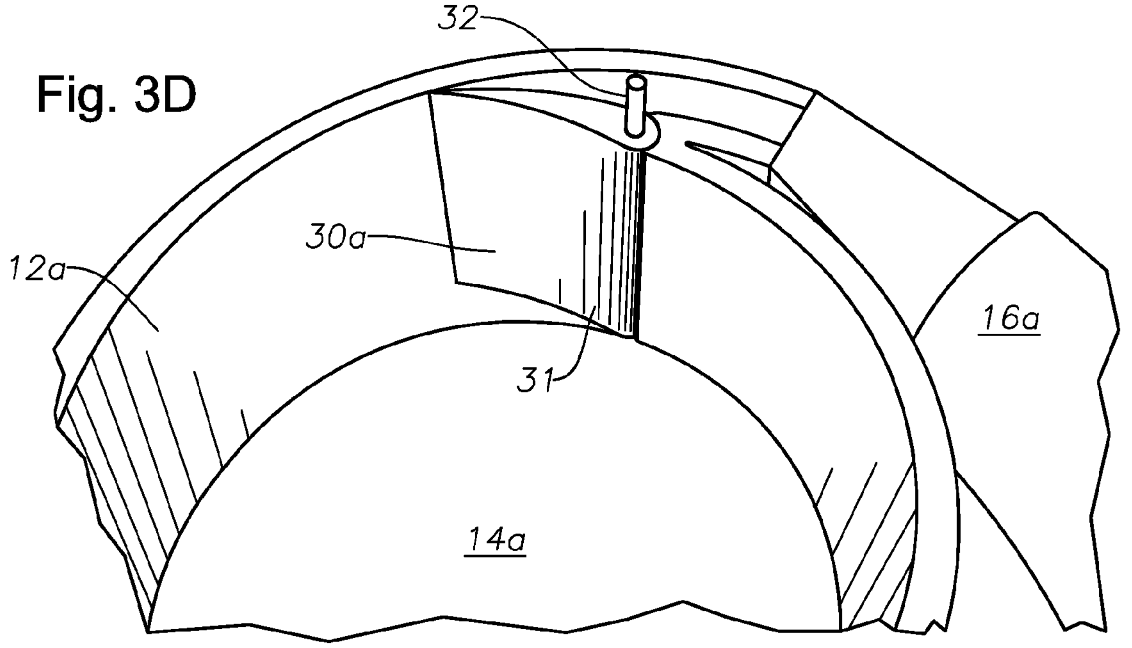
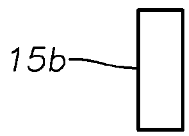
Fig. 3E

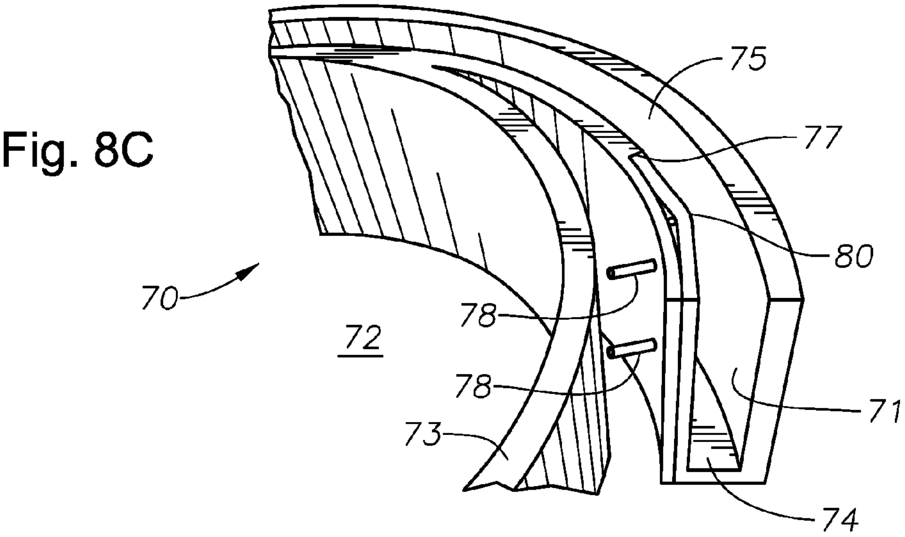
Fig. 8C
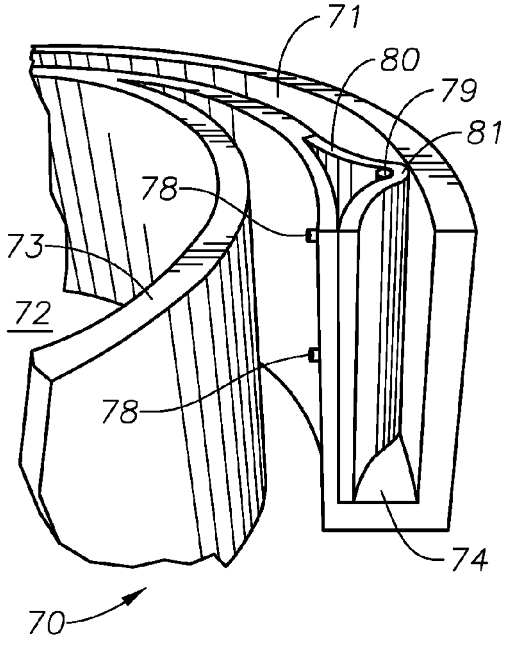
Fig. 8D
Fig. 8E
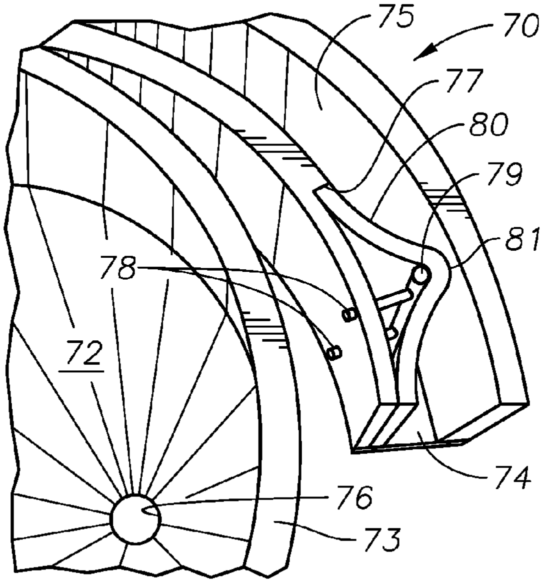

HYDROCYCLONES FOR TREATING DRILLING FLUID

BACKGROUND OF THE INVENTION

1. Field of the Invention

The present invention is directed to drilling fluid processing systems; to hydrocyclones used in such processing; to such hydrocyclones with a selectively adjustable inlet for drilling fluid; and to methods for using such systems and such hydrocyclones.

2. Description of the Related Art

In the drilling of a wellbore, a drill bit attached to the lower end of a drill string is rotated and lowered to form a hole in the earth. A drilling fluid is circulated through the hole, normally down the drill string to the bottom of the hole and upward through the annulus to the surface of the earth. The drilling fluid is referred to as drilling “mud”. The circulating drilling mud cools and lubricates the drilling bit and drill string, removes earth cuttings and solids from the hole, forms a filter cake on the hole wall, and/or controls formation pressure. Drilled solids can accumulate in the drilling mud and, if not removed, can adversely affect the hole and the drilling operations.

There are a variety of known drilling fluid processing systems, including, for example, but not limited to, those in U.S. Pat. Nos. 6,868,972; 6,669,027; 6,662,952; 6,352,159; 6,510,947; 5,861,362; 5,392,925; 5,229,018; 4,696,353; 4,459,207; 4,495,065; 4,446,022; 4,306,974; 4,319,991; and 4,116,288 (all said patents incorporated fully herein for all purposes).

Hydrocyclones are used in some known systems and methods to treat drilling muds to remove solids. Some typical hydrocyclones are separators with a separation chamber which, in some systems, is a generally cylindrical and conical separation chamber with an inlet, with an apex outlet located adjacent the apex of the cone, a vortex finder, and a vortex finder outlet located adjacent a base of the cone. Drilling mud is fed into the inlet and the inlet flow is converted into a flow with a tangential velocity along an inside wall of the separation chamber. The circular path of the flow results in centripetal acceleration which is applied to settling velocities of the suspended solids, driving larger and heavier particles outwardly toward the conical wall into an accelerating spiral along the wall to the apex outlet. These solids discharge at the apex of the cone. The liquid phase of the drilling mud, carrying smaller and lighter drilled solids, moves as a spiraling vortex to the vortex finder outlet.

U.S. Pat. Nos. 1,832,256; 2,870,990; 2,919,898; 2,941,783; 2,954,871; 3,016,962; 3,025,965; 3,057,476; 3,353,673; 3,358,833; 3,385,437; 3,766,997; 3,887,456; 3,893,914; 3,959,139; 3,964,557; 4,090,523; 4,134,828; 4,175,036; 4,226,708; 4,793,925; 5,108,608; 5,225,082; 5,240,115; 5,560,818; 5,858,237; 6,129,217; 6,533,946; 6,596,169; 6,855,261; 7,293,657; 7,438,142; and U.S. application Ser. No. 11/294,902 filed Dec. 6, 2005, Pub. No. 2008/0135300 published Jun. 12, 2008 disclose hydrocyclones and/or systems and methods which use hydrocyclones to treat drilling fluid—all said patents and said application incorporated fully herein for all purposes.

BRIEF SUMMARY OF THE INVENTION

The present invention, in certain aspects, discloses systems for processing a mixture of drilling fluid and solid material to separate at least one component of the mixture by size and/or by density from the mixture, the systems including: pumping apparatus for pumping a drilling fluid mixture, the drilling fluid mixture containing drilling fluid and solids; a hydrocyclone in fluid communication with the pumping apparatus for receiving the drilling fluid mixture therefrom, the hydrocyclone having an inner chamber and an inlet for the flow of the drilling fluid mixture into the hydrocyclone; the hydrocyclone having adjustment apparatus for adjusting flow of the drilling fluid mixture through the inlet.

The present invention discloses, in certain aspects, methods for treating a mixture of drilling fluid and solid material to separate at least one component of the mixture by size and/or by density from the mixture, such a method in one aspect including: feeding the mixture to a system, the system having a hydrocyclone and pumping apparatus for pumping a drilling fluid mixture, the drilling fluid mixture containing drilling fluid and solids, the hydrocyclone in fluid communication with the pumping apparatus for receiving the drilling fluid mixture therefrom, hydrocyclone adjustment apparatus mounted adjacent an inlet for adjusting flow of the drilling fluid mixture through the inlet and into an inner chamber; and adjusting the flow of the mixture into the inner chamber by using the adjustment apparatus adjacent the inlet.

The present invention discloses, in certain aspects, systems for processing a mixture of drilling fluid and solid material to separate at least one component of the mixture from the mixture, the systems having: a hydrocyclone (or a plurality of hydrocyclones in series) for receiving a drilling fluid mixture; the hydrocyclone (or each hydrocyclone) having an inner chamber and an inlet with an inlet flow channel, the drilling fluid mixture flowable through the inlet flow channel into the inner chamber, and the hydrocyclone (or each hydrocyclone) having adjustment apparatus mounted adjacent the inlet for adjusting flow of the drilling fluid mixture into the inner chamber. In such systems the adjustment apparatus may include a movable closure member movable to adjust effective size of the inlet flow channel; the movable closure member may be movable to close off the inlet flow channel to flow; and/or the inner chamber may be in a housing, the adjustment apparatus further having a movable closure member for adjusting flow through the inlet flow channel, an adjustment member connected to the movable closure member, and part of the adjustment member projecting out from the housing for movement thereof outside the housing to thereby move the movable closure member, either manually or by a control system.

Accordingly, the present invention includes features and advantages which are believed to enable it to advance hydrocyclone technology and to advance the processing of drilling fluid with a or several hydrocyclones. Characteristics and advantages of the present invention described above and additional features and benefits will be readily apparent to those skilled in the art upon consideration of the following description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions of embodiments preferred at the time of filing for this patent that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, other objects and purposes will be readily apparent to one of skill in this art who has the benefit of this invention's teachings and disclosures. It is, therefore, an object of at least certain embodiments of the present invention to provide the embodiments and aspects listed above and:

New, useful, unique, efficient, nonobvious drilling fluid processing systems using one or a plurality of hydrocyclones with an adjustable inlet system, and methods of the use of such a hydrocyclone, hydrocyclones, or a series thereof.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly, from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

FIG. 3C is a partial perspective view of an embodiment of a hydrocyclone according to the present invention as in FIG. 3A.

FIG. 3D is a partial perspective view of the hydrocyclone as shown in FIG. 3C with an inlet opening closed off to flow.

FIG. 3E is a cross-sectional view of an exemplary inlet passageway according to one embodiment of the present invention.

FIG. 8C is an enlarged perspective view of part of the hydrocyclone shown in FIG. 8B.

FIG. 8D is an enlarged perspective view of part of the hydrocyclone shown in FIG. 8A.

FIG. 8E is a top view of the part shown in FIG. 8D.

Figure 1:
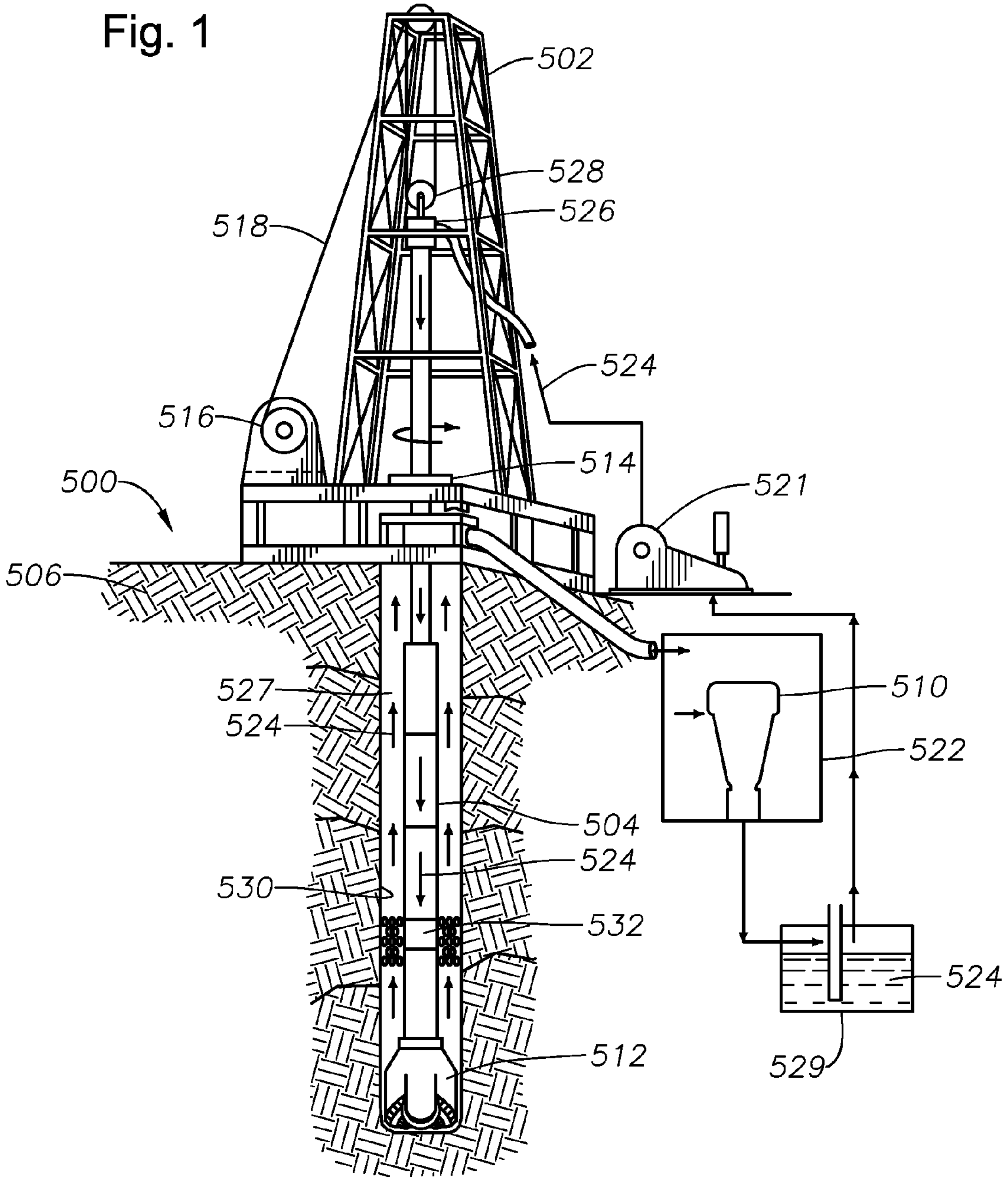
FIG. 1 is a schematic view of a system according to the present invention with a hydrocyclone according to the present invention.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

What follows are the descriptions of embodiments preferred at the time of filing for this patent.

The system 500 according to the present invention shown in FIG. 1 includes a derrick 502 from which extends a drillstring 504 into the earth 506. The drillstring 504, as is well known, can include drill pipes and drill collars. A drill bit 512 is at the end of the drillstring. A rotary system 514, top drive system 526, and/or a downhole motor 532 ("fluid motor", "mud motor") may be used to rotate the drillstring 504 and the drill bit 512. A typical drawworks 516 has a cable or rope apparatus 518 for supporting items in the derrick 502. A system with one, two, or more mud pump systems 521 supplies drilling fluid 524 to the drillstring 504. Drilling forms a wellbore 530 extending down into the earth 506.

During drilling, the drilling fluid 524 is pumped by the pumps 521 into the drillstring 504. Drilling fluid 524 flows to the drill bit 512, and then flows into the wellbore 530 through passages in the drill bit 512. Circulation of the drilling fluid 524 transports earth and/or rock cuttings, solids, debris, etc. from the bottom of the wellbore 530 to the surface through an annulus 527 between a well wall of the wellbore 530 and the drillstring 504. The cuttings, solids, etc. are removed from the drilling fluid 524 in a processing system 522 which includes at least one (or a plurality of) hydrocyclone 510 according to the present invention so that re-usable drilling fluid may be re-circulated from a mud pit 529 by the pumps 521 back to the drillstring 504.

Figure 2A:
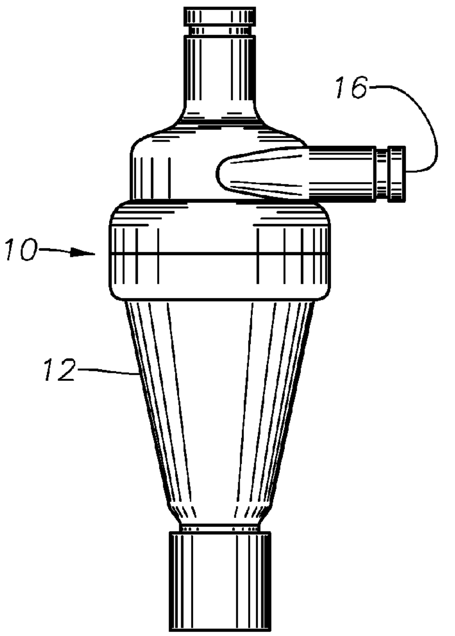
FIG. 2A is a perspective view of a hydrocyclone according to the present invention.
Figure 2B:
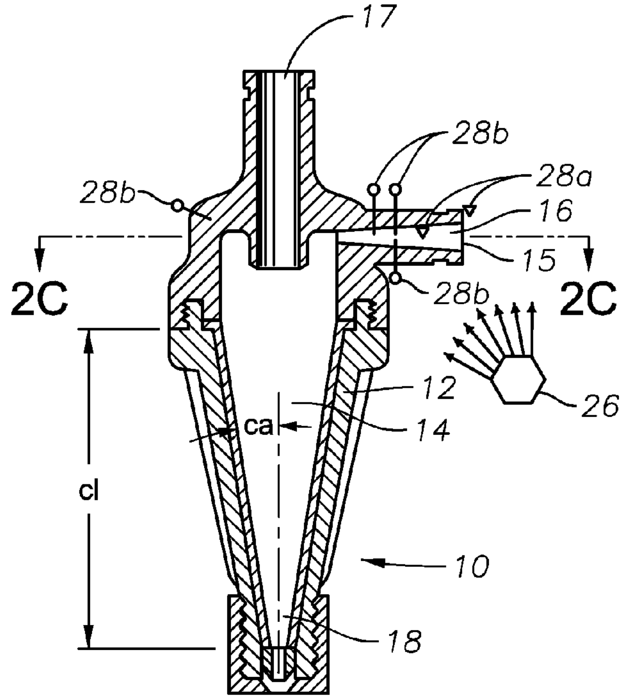
FIG. 2B is a cross-section view of the hydrocyclone of FIG. 2A.

FIGS. 2A and 2B show a hydrocyclone 10 according to the present invention which has a housing 12, an inner chamber 14, an inlet 16, with an opening 15, an outlet 17, (sometimes referred to as a "vortex finder," "vortex outlet," or "vortex finder outlet") an outlet (or apex) 18 and adjustment apparatus 20. The adjustment apparatus 20 (which may be any adjustment apparatus disclosed herein according to the present invention) is movable to selectively and controllably vary the effective size of the cross-sectional area of the opening 15 to control a flow of a drilling fluid mixture 11 into the inner chamber 14.

Figure 2C:
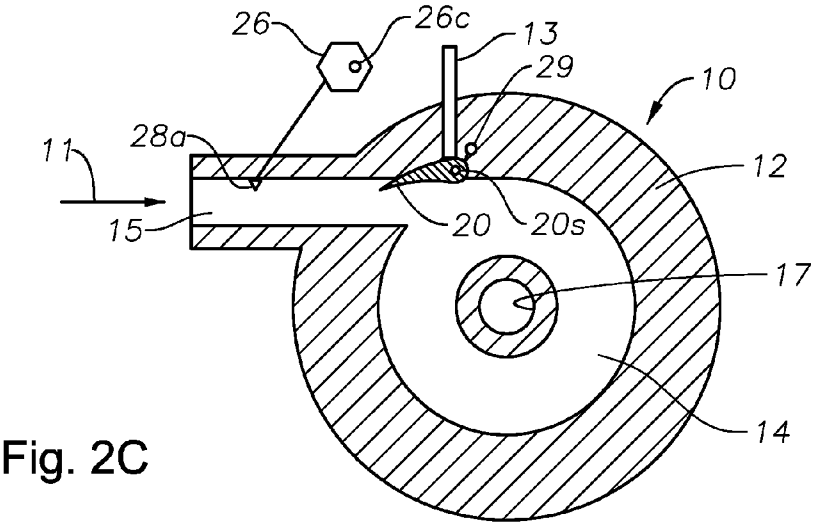
FIG. 2C is a cross-section view along line 2C-2C of FIG. 2B.

Optionally, the adjustment apparatus 20 is manually adjustable with an adjustment mechanism 13 (shown schematically, FIG. 2C). Optionally, a control system 26 is in communication with a sensor or sensors 28*a* (e.g. a sensor or sensors for sensing fluid pressure of the inlet feed) and/or sensors 28*b* located outside the inlet which sense position of and/or stress on the adjustment apparatus 20 and/or rotation of a shaft 20*s*; e.g., torsion spring(s), proximity switches(es), pressure gaug(es), and/or strain gauge(s). The apparatus 20 is on a shaft 20*s* and includes movement apparatus 29 for moving the adjustment apparatus 20. The control system 26 controls the adjustment apparatus 20 and the apparatus 29. In one aspect, the control system 26 includes computing apparatus 26*c* (e.g., a laptop computer, a desktop computer, a PLC, multiples of any of these, etc.) for computer control of the adjustment apparatus, including in one aspect, automatic control thereof. (Lines with arrows connected to the system 26, FIG. 2B, indicate lines to sensors and to apparatus 29.) Any system herein can have one, some, or all such sensors as described herein; and, thus, the position of a movable closure member for adjusting effective size of a flow inlet can be controlled in response to the pressure (constant or variable) of flow in direction opening or closing the inlet or in response to force (constant or variable) in a direction opening or closing the inlet—and this can be computer controlled.

Figure 3A:
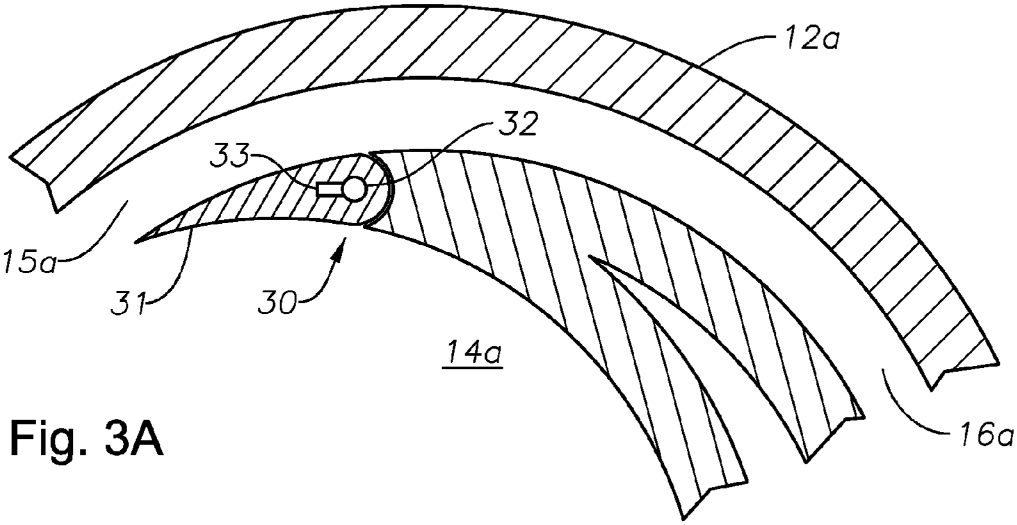
FIG. 3A is a partial view in cross-section of a hydrocyclone according to the present invention.
Figure 3B:
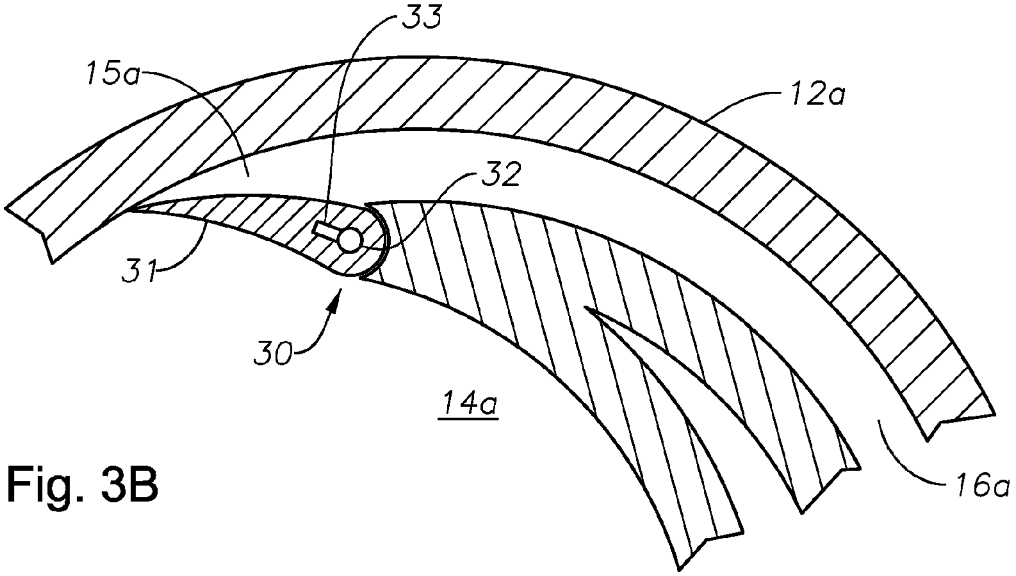
FIG. 3B is a cross-section view of the hydrocyclone of FIG. 3A showing an inlet opening closed to flow.

FIGS. 3A and 3B illustrate an adjustment apparatus 30 according to the present invention for changing the size of an opening 15*a* (like the opening 15, FIG. 2C) of an inlet 16*a* (like the inlet 16, FIG. 2B) of a hydrocyclone having a housing 12*a* (like the housing 12, FIG. 2A) with an inner chamber 14*a* (like the inner chamber 14, FIG. 2B). A closure toe 31 is pivotably connected to a rotatable shaft 32 by a key 33. The shaft 32, rotatably connected to the housing 12*a*, projects from the housing 12*a* for manual or controlled rotation to change the effective size of the opening 15*a*. As shown in FIG. 3B, the opening 15*a* may be closed off totally.

FIGS. 3C and 3D show a hydrocyclone like that of FIGS. 3A and 3B (like numerals indicate like parts) with an adjustment apparatus 30*a* (like the apparatus 30) which selectively closes off an inlet passageway 15*b* with a generally rectangular cross-section, as shown in FIG. 3E.

Figure 4A:
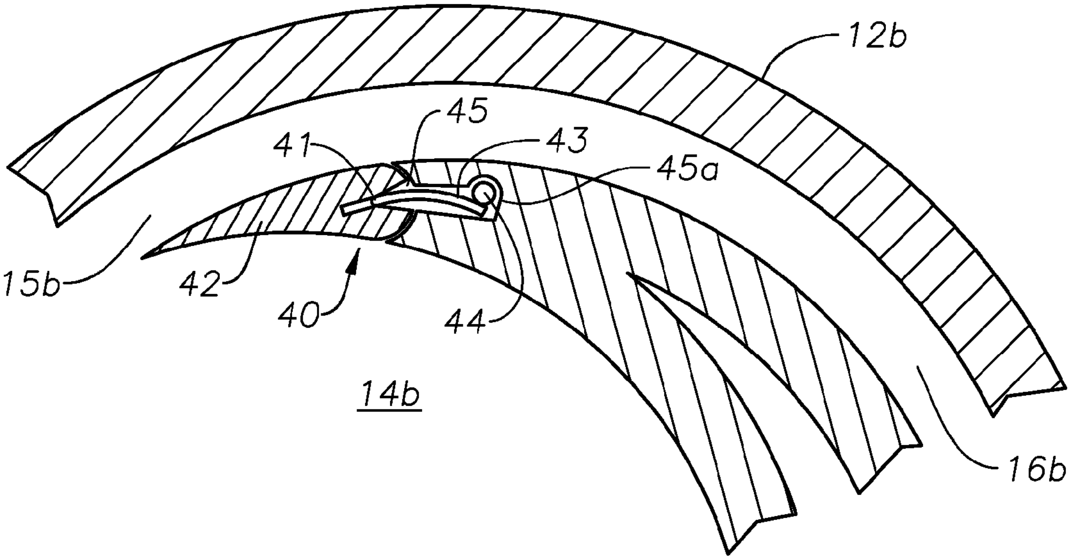
FIG. 4A is a partial view in cross-section of a hydrocyclone according to the present invention.
Figure 4B:
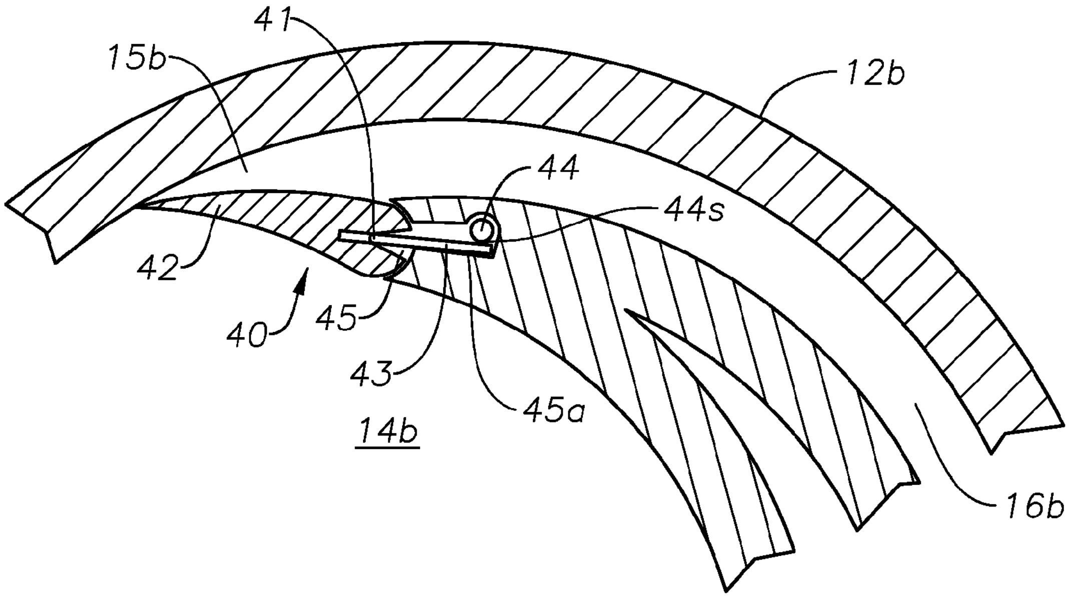
FIG. 4B is a cross-section view of the hydrocyclone of FIG. 4A showing an inlet opening closed to flow.

FIGS. 4A and 4B show an adjustment apparatus 40 according to the present invention for changing the size of an opening 15*b* (like the opening 15, FIG. 2C) of an inlet 16*b* (like the inlet 16, FIG. 2B) of a hydrocyclone having a housing 12*b* (like the housing 12, FIG. 2A) with an inner chamber 14*b* (like the inner chamber 14, FIG. 2B).

A pin 41 pivotably connects a closure toe 42 to the housing 12*b*. A flexible bar 43 extending into and connected at one end to the closure toe 42 has another end within a recess 45*a* and abutting a rotatable shaft 44. The shaft 44 is connected to the housing 12*b*. A portion of the flexible bar 43 extends through a chamber 45 of the housing 12*b*.

The flexible bar 43 is flexed, as shown in FIG. 4A, due to the force and/or pressure of a drilling fluid mixture flowing into the inlet 16*b* and through the opening 15*b* into the inner chamber 14*b*. As the force and/or pressure of flow decreases, the flexible bar 43 flexes less, partially closing off the opening 15*b*. When the spring force of the flexible bar 43 is not overcome by the force and/or pressure of flow, it moves the closure toe 42 to close off the opening 15*b* entirely (see FIG. 4B).

In one aspect the shaft 44 has an eccentric surface 44*s* that presses against the flexible bar 43 bending the bar 43. As shown in FIG. 4B, the bar 43 is flexed to its greatest extent. The shaft 44 can be rotated to change the amount of pressure applied by the toe 42 while the hydrocyclone is in operation. Rotating the shaft 44 to an intermediate position (intermediate those of FIGS. 4A and 4B) results in different amounts of closure pressure applied to the bar 43 and, thus, to the toe 42, at any given position. The shaft 44, therefore, acts as a cam shaft for adjusting the amount of force needed to change the size of the opening 15*b*.

In one particular aspect, the shaft 44 extends from the housing 12*b* for connection to a control system for controlled rotation or for manual rotation.

FIGS. 5A-5D show an adjustment apparatus 50 according to the present invention for changing the effective size on an opening 15*c* (like the opening 15, FIG. 2C) of an inlet 16*c*

(like the inlet 16, FIG. 2B) of a hydrocyclone having a housing 12*c* (like the housing 12, FIG. 2A) with an inner chamber 14*c* (like the chamber 14, FIG. 2B). The inlet passage is open in FIGS. 5A and 5C and closed to flow in FIGS. 5B and 5D.

A closure toe 52 has a movable wall 51 pivotably connected to the housing 12*c* with a pivot pin 54 and a movable wall 53 pivotably connected to the housing 12*c* with a pivot pin 55. The walls contact, but are not connected together, at a point 52*p*. In one aspect, an optional spring 51*s* pulls the walls 51, 53 together. The two pivot points, which do not project out from the surfaces near them, make it possible to have relatively smooth surfaces adjacent the pivot points for the interior of the hydrocyclone's separation chamber (e.g. a chamber 14, FIG. 2B) and a relatively smooth surface for the inlet. Smoother surfaces reduce unwanted turbulence. A shaft 50*t* (see FIGS. 5C, 5D) connected to the pivot pin 55 projects from the housing 12*c* for manual or controlled opening and closing of the inlet passageway.

Figure 5A:
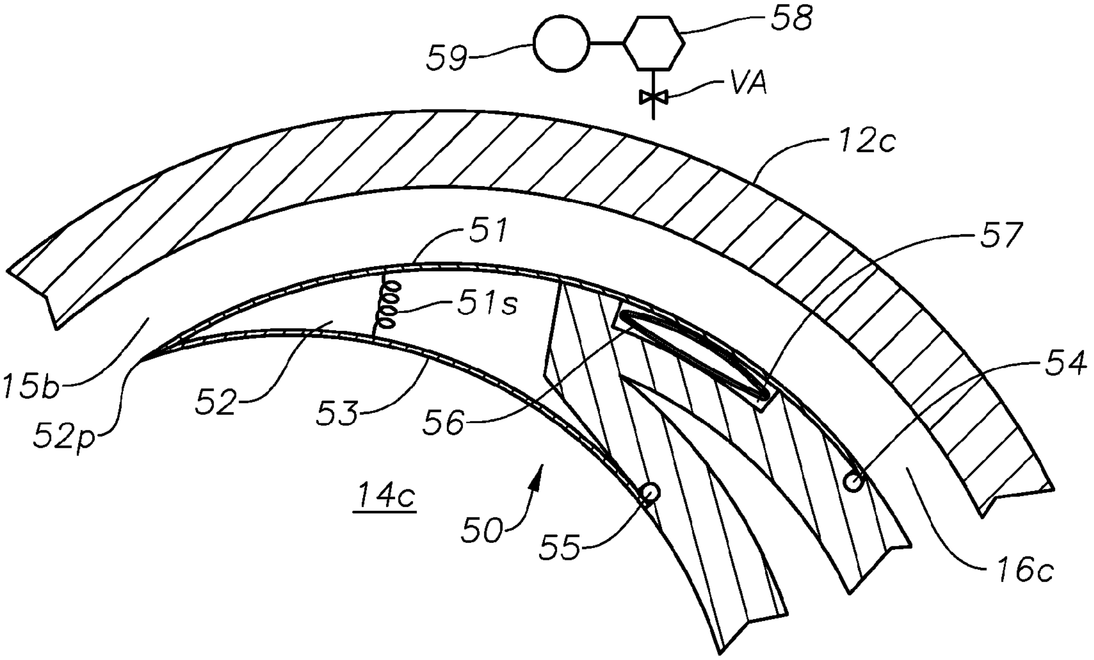
FIG. 5A is a partial view in cross-section of a hydrocyclone according to the present invention.

A selectively inflatable air bladder 56 in a chamber 57 in the body 12*c*, when deflated, allows the closure toe 52 to remain in an open position as shown in FIG. 5A with the opening 15*c* open. As the bladder 56 is inflated, the closure toe moves to close off the opening 15*c*. If the bladder 56 is inflated to the extent shown in FIG. 5B, the closure toe 52 closes off the opening 15*c* entirely.

Air is supplied through appropriate conduits to the bladder 56 from an external air supply 58 controlled by a control system 59 (and/or with a manually-operable valve apparatus VA).

It is within the scope of the present invention for a closure structure (e.g. any closure toe herein) to have any desired shape and/or cross-sectional shape for effecting partial and/or total closing off of the flow area of a hydrocyclone's inlet. FIGS. 6A-6D illustrate hydrocyclones 61-64 according to the present invention each with an inlet 61*i*-64*i*, respectively, each with a closure structure 61*s*-64*s*, respectively. As shown the closure structures 61*s*-64*s* have different cross-sectional shapes and occupy different areas of openings.

Figure 6A:
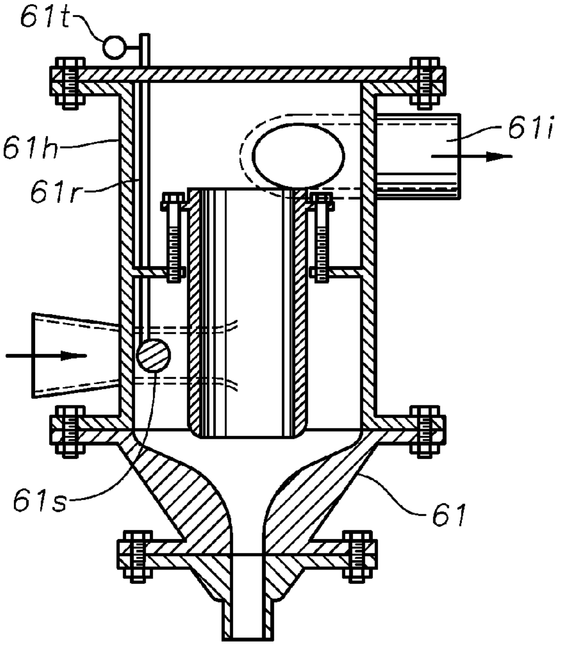
FIG. 6A is a cross-section view of a hydrocyclone (shown partially) according to the present invention.

As shown in FIG. 6A, the closure structure 61*s* is connected to a rotatable shaft 61*r* which extends outside of a housing 61*h*. The shaft 61*r* can be manually rotated or automatically rotated by an optional control system 61*t*.

In certain prior known hydrocyclones, when the feed flow rate is reduced, the feed velocity is also reduced. In other words, a smaller volume of feed per unit of time (cubic inches per minute, for example) travels through a passageway having a constant inlet cross-sectional area (in square inches), resulting in a lower velocity (in inches/minute). When the inlet velocity drops, separation performance of the hydrocyclone can suffer dramatically, and can even reach the point of total failure. In hydrocyclones according to the present invention, when the feed flow rate is reduced, the feed velocity can be maintained. A change in feed flow to smaller volume per unit of time (e.g., cubic inches per minute) is forced to travel through a smaller inlet passageway, with a reduced cross-sectional area (e.g. in square inches), resulting, in one aspect, in maintaining a constant velocity (e.g. in inches/minute).

In various aspects and embodiments of the present invention the position of a closure toe (e.g. any closure toe or structure in any embodiment of the present invention) at any given time may be controlled using a mechanism sensitive to pressure, sensitive to force, or both (e.g. a spring, an inflatable bladder), that provides:

a. constant pressure in the direction closing the inlet;

b. constant pressure in the direction opening the inlet;

c. variable pressure in the direction closing the inlet;

d. variable pressure in the direction opening the inlet;

e. computer controlled pressure in the direction closing the inlet;

f. computer controlled pressure in the direction opening the inlet;

g. constant force in the direction closing the inlet;

h. constant force in the direction opening the inlet;

I. Variable force in the direction closing the inlet;

j. variable force in the direction opening the inlet;

k. computer controlled force in the direction closing the inlet; or l. computer controlled force in the direction opening the inlet.

Figure 5B:
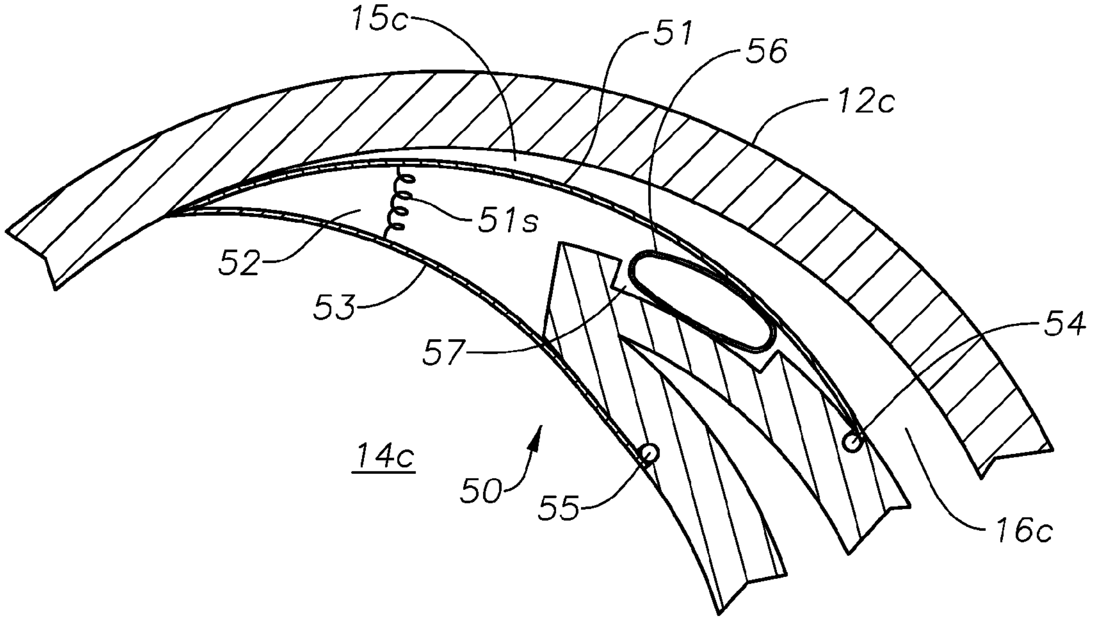
FIG. 5B is a cross-section view of the hydrocyclone of FIG. 5A showing an inlet opening closed to flow.
Figure 5C:
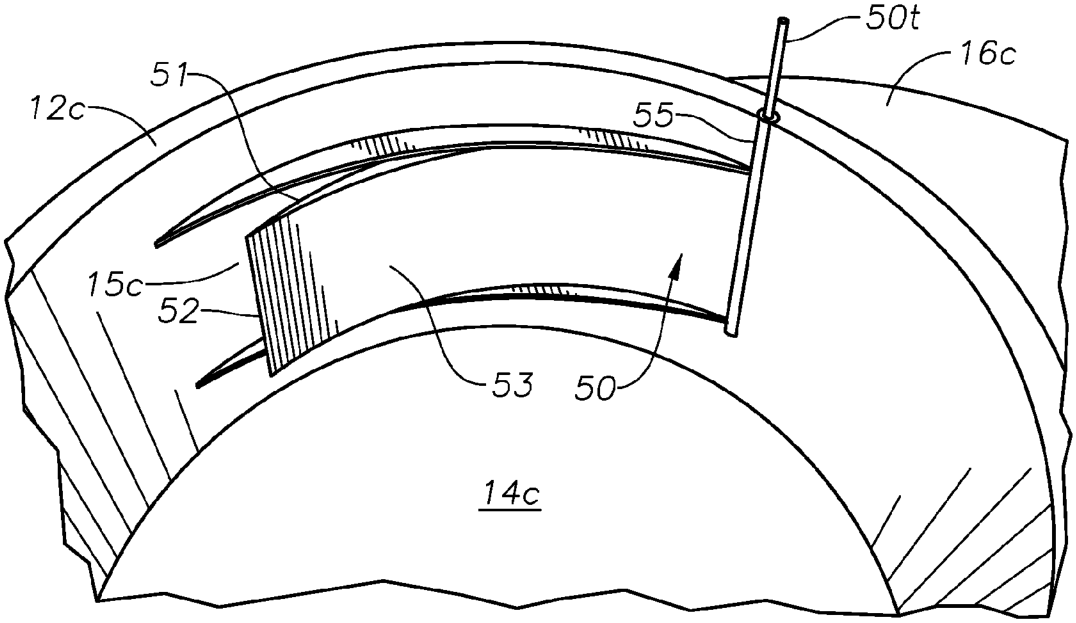
FIG. 5C is a partial perspective view of the hydrocyclone of FIG. 5A.
Figure 5D:
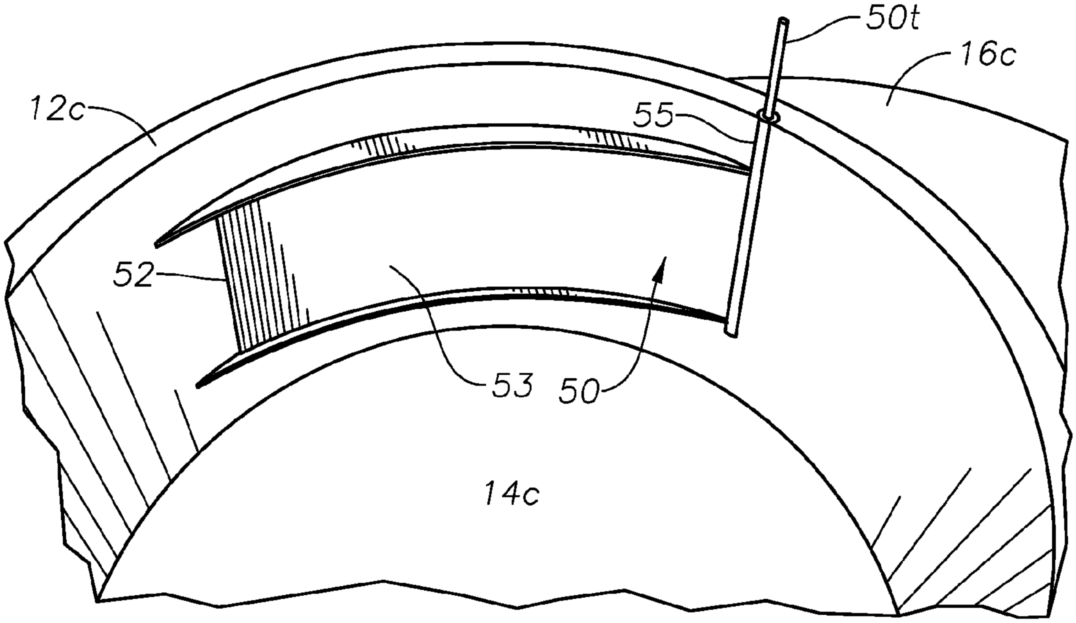
FIG. 5D is a partial perspective view of the hydrocyclone of FIG. 5A.
Figure 6B:
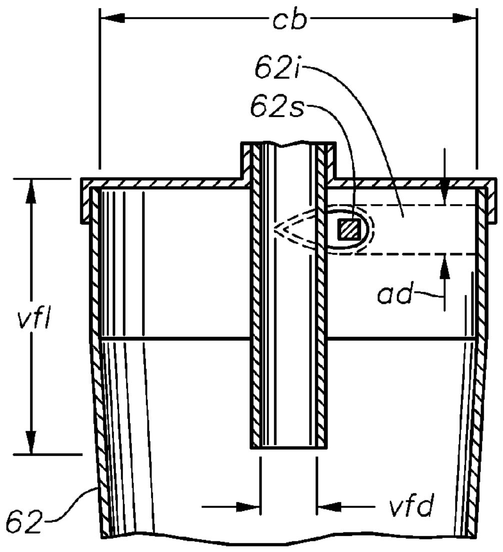
FIG. 6B is a cross-section view of a hydrocyclone (shown partially) according to the present invention.
Figure 6C:
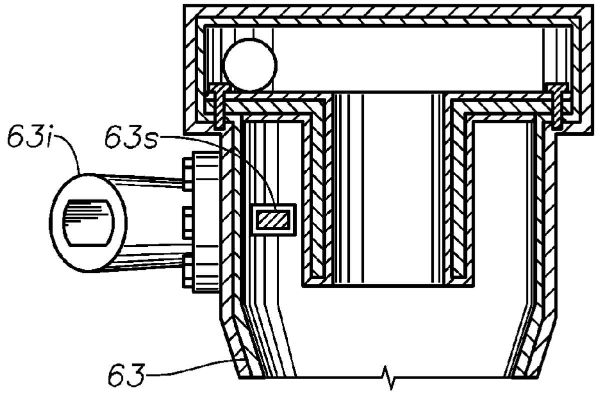
FIG. 6C is a cross-section view of a hydrocyclone (shown partially) according to the present invention.
Figure 6D:
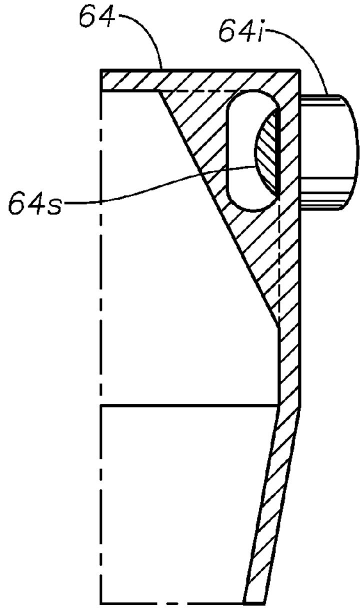
FIG. 6D is a cross-section view of a hydrocyclone (shown partially) according to the present invention.
Figure 7:
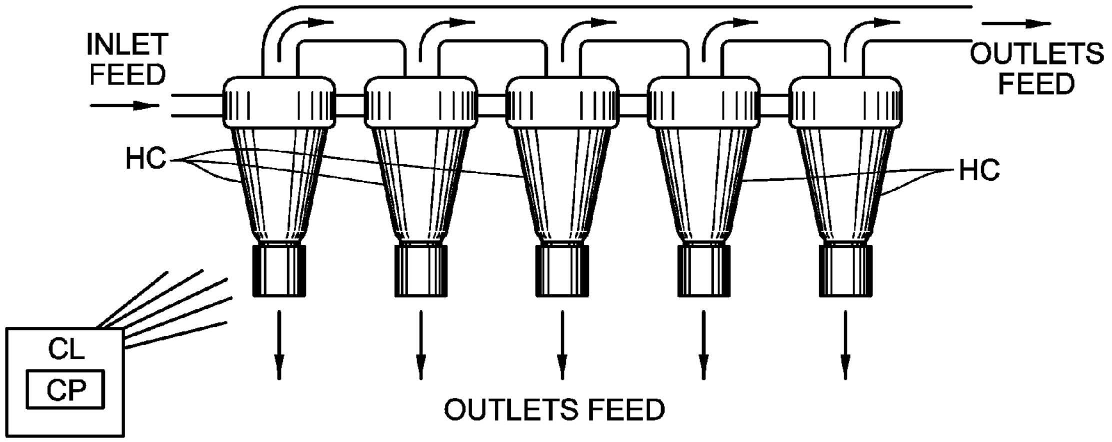
FIG. 7 is a schematic view of a system according to the present invention with multiple hydrocyclones according to the present invention.

As shown, e.g., in FIGS. 3B, 4B and 5B, an adjustment apparatus in a hydrocyclone according to the present invention can completely close off an inlet, shutting off flow to that hydrocyclone. In one aspect, the toe subsequently opens the inlet opening once a suitably high target feed pressure is achieved. In one aspect, systems according to the present invention with relatively inexpensive control elements, (e.g. a spring) can have closure toe pressure settings installed by design. For a system as in FIG. 7 with multiple hydrocyclones HC according to the present invention, these options are possible using a hydrocyclone or hydrocyclones according to the present invention:

a. As feed volume increases, various pressure settings for the closure toes allow one or more hydrocyclone inlets to open;

b. As feed volume increases, the first hydrocyclone(s) to open (e.g. those with lower pressure settings for the closure toe) have one particular cylindrical body diameter, while the next hydrocyclone(s) to open (as the feed pressure increases), have second or third cylindrical body diameter values different from the first diameter;

c. As feed volume increases, the first hydrocyclone(s) to open (e.g. those with lower pressure settings for the closure toe) have one particular first vortex finder length, while the next hydrocyclone(s) to open (as the feed pressure increases), have second or third vortex finder length values different from the first length;

d. As feed volume increases, the first hydrocyclone(s) to open (those with lower pressure settings for the closure toe) have one particular first vortex finder diameter, while the next hydrocyclone(s) to open (as the feed pressure increases), have second or third vortex finder diameter values different from the first diameter;

e. As feed volume increases, the first hydrocyclone(s) to open (those with lower pressure settings for the closure toe) have one particular first cone angle, while the next hydrocyclone(s) to open (as the feed pressure increases), have second or third cone angle values different from the first;

f. As feed volume increases, the first hydrocyclone(s) to open (those with lower pressure settings for the closure toe) have one particular first cone length, while the next hydrocyclone(s) to open (as the feed pressure increases), have second or third cone length values different from the first;

g. As feed volume increases, the first hydrocyclone(s) to open (those with lower pressure settings for the closure toe) have one particular first apex diameter, while the next hydrocyclone(s) to open (as the feed pressure increases), have second or third apex diameter values different from the first;

h. As feed volume increases, the first hydrocyclone(s) to open (those with lower pressure settings for the closure toe) have one particular first combination of geometric features as in b-g above while the next hydrocyclone(s) to open (as the feed pressure increases), have a second or third combination of values for the geometric features different from the first. Examples of various dimensions are as follows:

a. cylindrical body diameter—"cb," FIG. 6B.
b. vortex finder length—"vfl," FIG. 6B.
c. vortex finder diameter—"vfd," FIG. 6B.
d. cone angle—angle "ca," FIG. 2B.
e. cone length—"cl," FIG. 2B.
f. apex diameter—"ad," FIG. 6B.

Optionally, the control strategies described in a-h above are, in one aspect, incorporated in the programming of a process control computing apparatus CP (FIG. 7) of a control system CL and al the closure toes are controlled accordingly.

FIGS. 8A-8E illustrate a hydrocyclone 70 (shown partially) with a chamber 72 in a housing 73 into which material is fed through an inlet 74 with an inlet passageway 75. The hydrocyclone 70 has a vortex finder outlet (not shown; e.g. as in any system described herein) and a lower outlet 76.

A flexible closure member 80 is secured to a wall 77 of the inlet 74. The member 80 is movable to close off the passageway 75. Shafts 78 (not shown in FIGS. 8A, 8B0 connected to a bar 79 project outside the hydrocyclone 70 for manual or automatically-controlled selective movement of the member 80. The bar 79 pushes against the member 80 to move the member 80 as shown in FIGS. 8A, 8D and 8E.

Figure 8A:
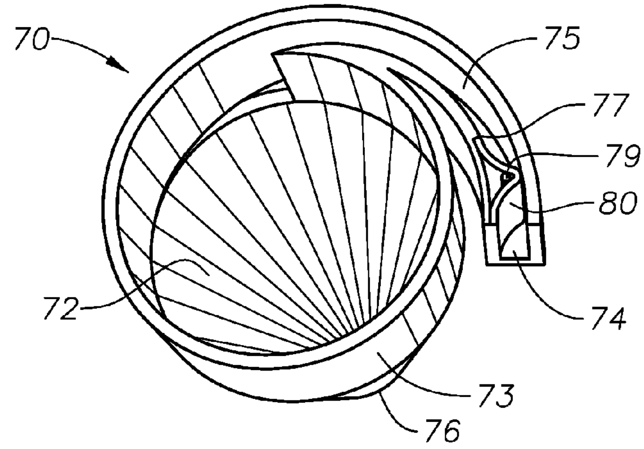
FIG. 8A is a top perspective view of a hydrocyclone according to the present invention.
Figure 8B:
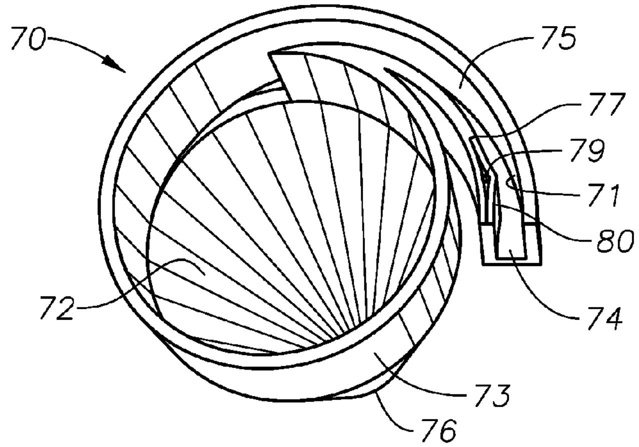
FIG. 8B is a top perspective view of the hydrocyclone of FIG. 8A.

As shown in FIGS. 8B and 8C, the member 80 is positioned so that flow through the passageway 75 is possible. As show in FIGS. 8A, 8D, and 8E, the member 80 has been moved so that a part 81 thereof sealingly contacts a wall 71 of the inlet 74 shutting off flow through the passageway 75.

Figure 9A:
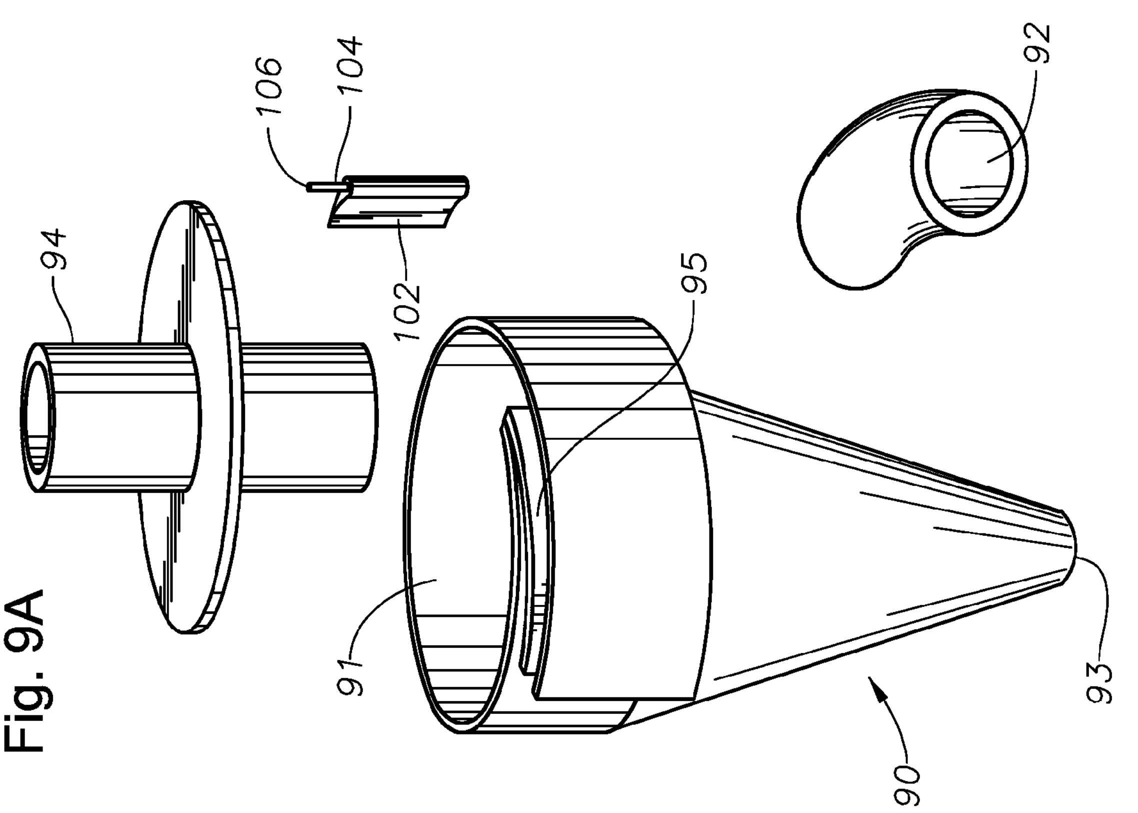
FIG. 9A is an exploded view of the hydrocyclone of FIG. 9.
Figure 9:
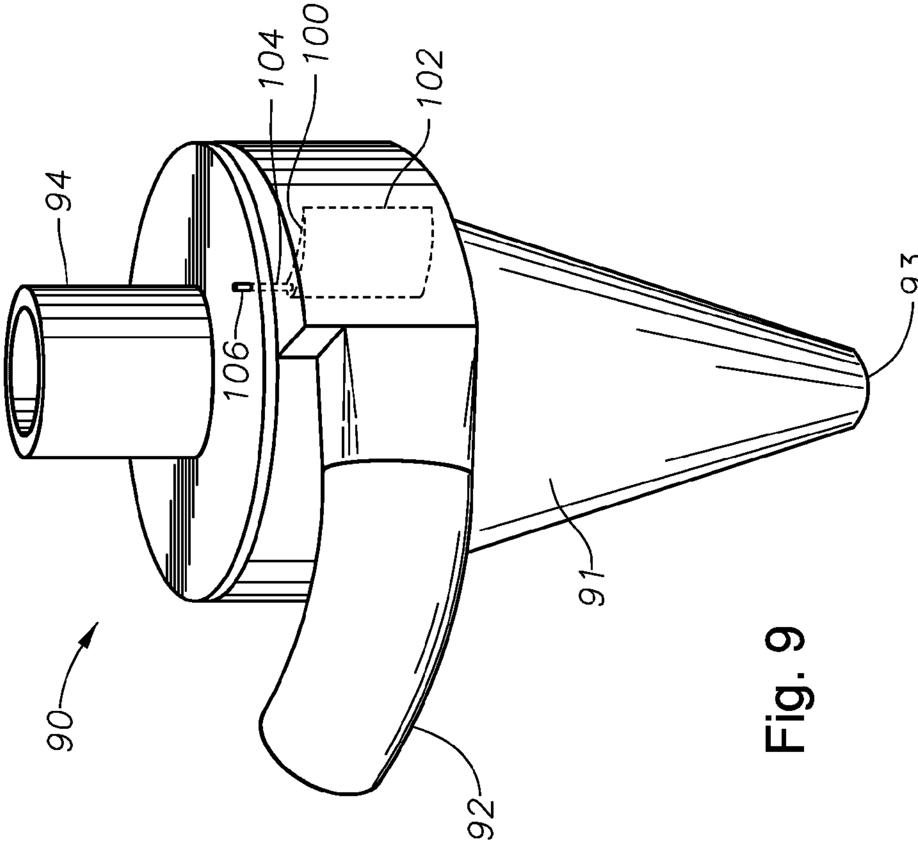
FIG. 9 is a perspective view of a hydrocyclone according to the present invention.

FIGS. 9 and 9A show a hydrocyclone 90 according to the present invention (exploded view in FIG. 9A) which has a housing 91 with an inlet 92, a lower outlet 93 and a vortex finder outlet structure 94. A closure apparatus 100 selectively closes off a flow passageway 95 of the inlet 92.

The closure apparatus 100 has a movable toe 102 secured to a rotatable shaft 104. Optionally, a top 106 of the shaft 104 projects from the housing 91 for manual shaft rotation or for interconnection with an automatic control system.

Any closure apparatus or structure disclosed herein for any embodiment according to the present invention may be used with the hydrocyclone 90.

The present invention, therefore, provides in some, but not in necessarily all embodiments a system for processing a mixture of drilling fluid and solid material to separate at least one component of the mixture from the mixture, the system including: a hydrocyclone for receiving a drilling fluid mixture; the hydrocyclone having an inner chamber and an inlet with an inlet flow channel, the drilling fluid mixture flowable through the inlet flow channel into the inner chamber; and the hydrocyclone having adjustment apparatus mounted adjacent the inlet for adjusting flow of the drilling fluid mixture into the inner chamber. Such a system may one or some, in any possible combination, of the following: wherein the adjustment apparatus includes a movable closure member movable to adjust effective size of the inlet flow channel; wherein the movable closure member is movable to close off the inlet flow channel to flow; wherein the inner chamber is in a housing and the adjustment apparatus further having a movable closure member for adjusting flow through the inlet flow channel, an adjustment member connected to the movable closure member, part of the adjustment member projecting out from the housing for movement thereof outside the housing to thereby move the movable closure member; wherein the part of the adjustment member projecting out from the housing is manually rotatable; a control system connected to the adjustment apparatus, the control system for automatically moving the part of the adjustment apparatus projecting out from the housing to correspondingly move the movable closure member; first sensor apparatus connected to the housing in communication with the control system, the sensor apparatus for sensing pressure of the drilling fluid mixture in the inlet and for providing a first signal indicative thereof to the control system, the control system for controlling the adjustment apparatus in response to said first signal; second sensor apparatus connected to the housing for sensing a position of the movable closure member, for producing a second signal indicative thereof, and for providing said second signal to the control system, the control system for controlling the adjustment apparatus in response to said second signal; third sensor apparatus connected to the housing for sensing stress on the adjustment apparatus, for producing a third signal indicative thereof, and for providing said third signal to the control system, the control system for controlling the adjustment apparatus in response to said third signal; the adjustment apparatus including a movable closure member movable to adjust effective size of the inlet flow channel, a flexible bar with a first end secured to the movable closure member, the flexible bar having a second end located within and free to move with respect to a recess in the housing, and the flexible bar flexible by the flow of the mixture through the inlet to move the movable closure member in response to flow of the drilling fluid mixture; a bar shaft adjacent the second end of the flexible bar, and the bar shaft rotatable to move the flexible bar thereby moving the movable closure member; the adjustment apparatus including a movable closure member movable to adjust effective size of the inlet flow channel, a first movable wall pivotably connected to the housing, and a selectively inflatable bladder abutting the first movable wall for selectively moving the movable wall to adjust effective size of the inlet; wherein the adjustment apparatus includes a second movable wall, the second movable wall movable with the first movable wall; the adjustment apparatus including the inlet having a first wall spaced-apart from a second wall, a flexible closure member secured to the first wall of the inlet, and the flexible closure member movable to sealingly abut the second wall of the inlet to restrict or close off flow through the inlet; and/or a part contacting the flexible closure member and projecting from the housing, the part movable to move the flexible closure member into contact with the second wall.

The present invention, therefore, provides in some, but not in necessarily all embodiments a system for processing a mixture of drilling fluid and solid material to separate at least one component of the mixture from the mixture, the system including: a hydrocyclone for receiving a drilling fluid mixture; the hydrocyclone having an inner chamber and an inlet with an inlet flow channel, the drilling fluid mixture flowable through the inlet flow channel into the inner chamber; the hydrocyclone having adjustment apparatus mounted adjacent the inlet for adjusting flow of the drilling fluid mixture into the inner chamber; the adjustment apparatus including a movable closure member movable to adjust effective size of the inlet flow channel; the movable closure member also movable to close off the inlet flow channel to flow; the inner chamber in a housing and the adjustment apparatus further having an adjustment member connected to the movable closure member, and part of the adjustment member projecting out from the housing for movement thereof outside the housing to thereby move the movable closure member.

The present invention, therefore, provides in some, but not in necessarily all embodiments a system with a plurality of hydrocyclones wherein each hydrocyclone of the plurality of hydrocyclones is a hydrocyclone according to the present invention, the top outlet flow of each hydrocyclone except a last hydrocyclone fed in series to another hydrocyclone of the plurality of hydrocyclones, each top outlet flow with particles therein. In such a system the adjustment apparatus of each hydrocyclone can include a closure member movable to adjust effective size of the inlet and as feed volume increases, the hydrocyclones can operate in accord with one of the schemes disclosed herein.

The present invention, therefore, provides in some, but not in necessarily all embodiments a method for treating a mixture of drilling fluid and solid material to separate at least one component of the mixture from the mixture, the drilling fluid mixture containing drilling fluid and solids, the method including feeding the mixture to a hydrocyclone according to the present invention and adjusting the flow of the mixture into the inner chamber by moving an adjustment apparatus according to the present invention.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with the requirements of 35 U.S.C. §112. The inventors may rely on the Doctrine of Equivalents to determine and assess the scope of their invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Whereas the present invention has been described in particular relation to the drawings attached hereto, it should be understood that other and further modifications apart from those shown or suggested herein, may be made within the scope and spirit of the present invention.

What is claimed is:

1. A system capable of processing a mixture of drilling fluid and solid material to separate at least one component from the mixture, the system comprising:
- a hydrocyclone that is adapted to receive a drilling fluid mixture, the hydrocyclone comprising:
  - a housing;
  - an inner chamber in said housing;
  - an inlet comprising an inlet flow channel that is adapted to allow the drilling fluid mixture to flow into the inner chamber; and
  - an adjustment apparatus mounted adjacent the inlet, wherein the adjustment apparatus is adapted to adjust flow of the drilling fluid mixture through the inlet flow channel and into the inner chamber, the adjustment apparatus comprising:
    - a movable closure member that is adapted to be moved so as to adjust an effective size of the inlet flow channel; and
    - a flexible bar comprising a first end that is secured to the movable closure member and a second end that is located within and free to move with respect to a recess in said housing, wherein the flexible bar is adapted to be flexed by a flow of said drilling fluid mixture through the inlet so as to move the movable closure member in response to said flow of said drilling fluid mixture.

2. The system of claim 1 wherein the movable closure member is adapted to be moved so as to close off the inlet flow channel to flow.

3. The system of claim 1 wherein the adjustment apparatus further comprises an adjustment member that is connected to and adapted to move the movable closure member, wherein an exposed part of the adjustment member projects out from the housing, and wherein movement of said exposed part of said adjustment member moves the movable closure member.

4. The system of claim 3 wherein the exposed part of the adjustment member that projects out from the housing is manually rotatable.

5. The system of claim 3 further comprising a control system operatively coupled to the adjustment apparatus, wherein the control system is adapted to move the exposed part of the adjustment apparatus that projects out from the housing so as to move the movable closure member.

6. The system of claim 5 further comprising a first sensor apparatus operatively coupled to the housing, wherein the first sensor is in communication with the control system and is adapted to sense a pressure of the drilling fluid mixture in the inlet and provide a first signal indicative thereof to the control system, and wherein the control system is adapted to control the adjustment apparatus in response to said first signal.

7. The system of claim 6 further comprising a second sensor apparatus operatively coupled to the housing, wherein the second sensor is adapted to sense a position of the movable closure member, produce a second signal indicative thereof, and provide said second signal to the control system, and wherein the control system is adapted to control the adjustment apparatus in response to said second signal.

8. The system of claim 7 further comprising a third sensor apparatus operatively coupled to the housing, wherein the second sensor is adapted to sense a stress on the adjustment apparatus, produce a third signal indicative thereof, and provide said third signal to the control system, and wherein the control system is adapted to control the adjustment apparatus in response to said third signal.

9. The system of claim 3, wherein said adjustment member comprises a rotatable a bar shaft adjacent the second end of the flexible bar, wherein the rotatable bar shaft is a adapted to move the flexible bar so as to move the movable closure member.

10. A system capable of processing a mixture of drilling fluid and solid material to separate at least one component from the mixture, the system comprising:
- a hydrocyclone that is adapted to receive a drilling fluid mixture, the hydrocyclone comprising:
  - a housing;
  - an inner chamber in said housing;

an inlet comprising an inlet flow channel that is adapted to allow the drilling fluid mixture to flow into the inner chamber; and an adjustment apparatus mounted adjacent the inlet, wherein the adjustment apparatus is adapted to adjust flow of the drilling fluid mixture through the inlet flow channel and into the inner chamber, the adjustment apparatus comprising:

a movable closure member that is adapted to be moved so as to adjust an effective size of the inlet flow channel, the movable closure member being further adapted to be moved so as to close off the inlet flow channel to flow;

a flexible bar comprising a first end that is secured to the movable closure member and a second end that is located within and free to move with respect to a recess in said housing, wherein the flexible bar is adapted to be flexed by a flow of said drilling fluid mixture through the inlet so as to move the movable closure member in response to said flow of said drilling fluid mixture; and an adjustment member that is connected to and adapted to move the movable closure member, wherein an exposed part of the adjustment member projects out from the housing, and wherein movement of said exposed part of said adjustment member moves the movable closure member.

11. A system capable of processing a mixture of drilling fluid and solid material, the system comprising:

a hydrocyclone that is adapted to receive a drilling fluid mixture, said hydrocyclone comprising a housing;

an inner chamber in said housing;

an inlet comprising an inlet flow channel, wherein said inlet flow channel is adapted to allow a flow of said drilling fluid mixture into said inner chamber; and an adjustment apparatus mounted adjacent said inlet, wherein said adjustment apparatus is adapted to adjust said flow of said mixture into said inner chamber, said adjustment apparatus comprising a movable closure member that is adapted to be moved so as to adjust an effective size of said inlet flow channel, said movable closure member comprising:

a first movable wall pivotably connected to said housing; and a selectively inflatable bladder abutting said first movable wall, wherein said selectively inflatable bladder is adapted to selectively move said first movable wall so as to adjust said effective size of said inlet flow channel.

12. The system of claim 11, wherein the adjustment apparatus comprises a second movable wall, the second movable wall being movable with the first movable wall.

13. The system of claim 11, further comprising a control system operatively coupled to said adjustment apparatus, wherein said control system is adapted to control said selectively inflatable bladder so as to selectively move said first movable wall.

14. A system capable of processing a mixture of drilling fluid and solid material, the system comprising:

a hydrocyclone that is adapted to receive a drilling fluid mixture, said hydrocyclone comprising:

a housing;

an inner chamber in said housing;

an inlet comprising an inlet flow channel, wherein said inlet flow channel is adapted to allow a flow of said drilling fluid mixture into said inner chamber; and an adjustment apparatus mounted adjacent said inlet, wherein said adjustment apparatus is adapted to adjust said flow of said mixture into said inner chamber, said adjustment apparatus comprising:

a flexible closure member secured to a first inlet wall of said inlet; and an adjustment member contacting said flexible closure member, wherein at least a part of said adjustment member projects from said housing and is adapted to be moved in a direction that is substantially perpendicular to a direction of said flow of said drilling fluid mixture through said inlet flow channel so as to move said flexible closure member and adjust an effective size of said inlet flow channel.

15. The system of claim 14, wherein said inlet comprises a second inlet wall spaced apart from said first inlet wall, and wherein said flexible closure member is adapted to be moved by said adjustment member so as to sealingly abut said second inlet wall.

16. The system of claim 14, wherein said inlet comprises a feed end and a chamber end downstream of said feed end, wherein said chamber end is proximate said inner chamber and said adjustment apparatus is proximate said feed end.

17. The system of claim 14, further comprising a control system operatively coupled to said adjustment apparatus, wherein said control system is adapted to control said adjustment member and movement of said flexible closure member.

* * * * *

UNITED STATES PATENT AND TRADEMARK OFFICE

CERTIFICATE OF CORRECTION

PATENT NO. : 8,202,415 B2
APPLICATION NO. : 12/423127
DATED : June 19, 2012
INVENTOR(S) : Thomas Robert Larson It is certified that error appears in the above-identified patent and that said Letters Patent is hereby corrected as shown below:

Col. 12, line 57 (claim 9, line 2), after "rotatable", delete "a".

Signed and Sealed this
Seventh Day of August, 2012

David J. Kappos
*Director of the United States Patent and Trademark Office*